July 4, 1961 W. G. EDWARDS 2,991,009
CODED DIGIT ADDER
Filed April 2, 1957 6 Sheets-Sheet 1

INVENTOR:
Walter G. Edwards
By Louis A. Kline
John J. Matlago
His Attorneys

July 4, 1961    W. G. EDWARDS    2,991,009
CODED DIGIT ADDER

Filed April 2, 1957    6 Sheets-Sheet 3

$$S_{e1} = (H'_{e1}G_1 + H_{e1}G'_1)K'_a + (H'_{e1}G_1 + H_{e1}G'_1)'K_a$$

$$K_{e1} = (H'_{e1}G_1 + H_{e1}G'_1)'G_1 + (H'_{e1}G_1 + H_{e1}G'_1)K_a$$

INVENTOR:
Walter G. Edwards

By Louis A. Kline
John T. Matlago
His Attorneys

July 4, 1961  W. G. EDWARDS  2,991,009
CODED DIGIT ADDER
Filed April 2, 1957  6 Sheets-Sheet 4

$K_{e1} = (H'_{e1}G_1 + H_{e1}G'_1)'G_1 + (H'_{e1}G_1 + H_{e1}G'_1)K_a$ $K'_{e2} = (H'_{e2}G_2 + H_{e2}G'_2)'G'_2 + (H'_{e2}G_2 + H_{e2}G'_2)K'_{e1}$ $K_{e3} = (H'_{e3}G_3 + H_{e3}G'_3)'G_3 + (H'_{e3}G_3 + H_{e3}G'_3)K_{e2}$ $K'_{e4} = (H'_{e4}G_4 + H_{e4}G'_4)'G'_4 + (H'_{e4}G_4 + H_{e4}G'_4)K'_{e3}$

INVENTOR:
Walter G. Edwards

By Louis A. Kline
John T. Matlago
His Attorneys

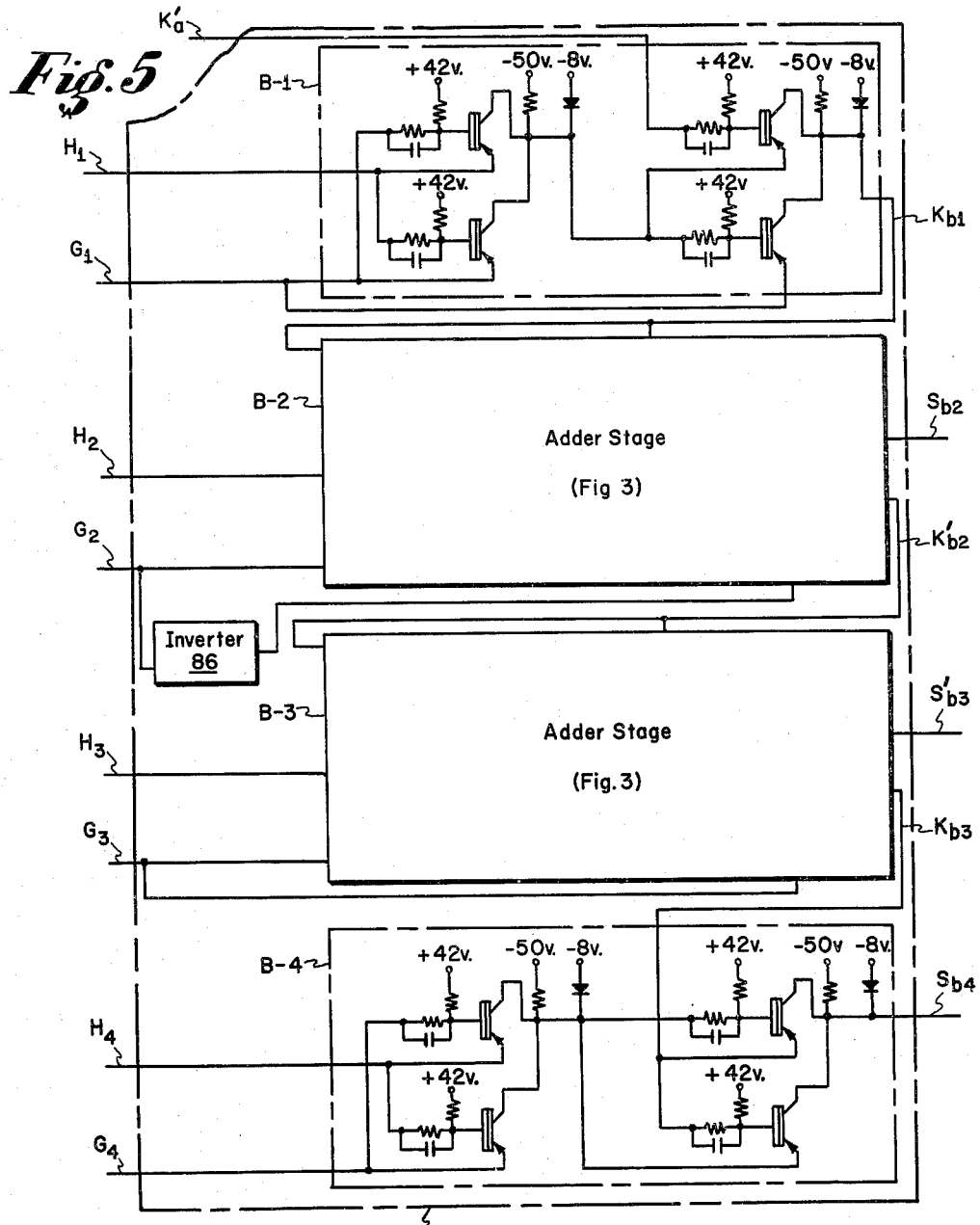

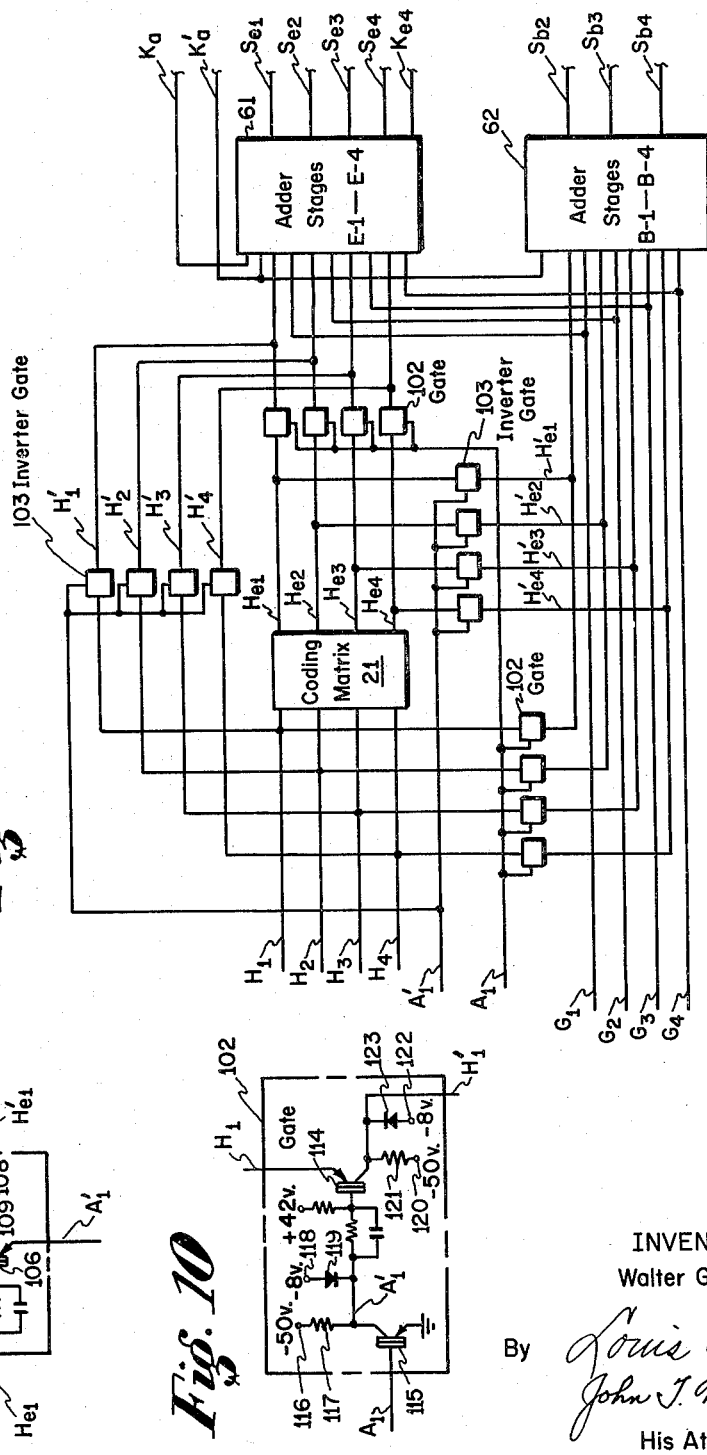

United States Patent Office

2,991,009
Patented July 4, 1961

2,991,009
CODED DIGIT ADDER
Walter G. Edwards, Manhattan Beach, Calif., assignor to The National Cash Register Company, Dayton, Ohio, a corporation of Maryland
Filed Apr. 2, 1957, Ser. No. 650,275
10 Claims. (Cl. 235—169)

This invention relates to digital adding circuitry and more particularly to a novel electronic adder operating in parallel fashion on the binary signals representing the coded decimal digits of numbers to be added.

In electronic computers utilizing electronic circuits suitable for storing information in a binary system, it is highly desirable to represent a decimal digit by a four binary digit code since most operators are accustomed to the decimal number system. It is further highly desirable to provide adder circuit arrangements which can immediately generate binary signals representing the coded decimal digit of the sum in direct response to the binary signals representing the incoming coded decimal digits. This enables the addition of a pair of binary coded decimal digits to be accomplished during each basic clock period of the computer operation, i.e., at the same high rate of speed that the more simple computer operations such as recirculation, comparison, etc. are generally performed.

Such a parallel added circuitry arrangement in particular requires that the circuitry for each binary stage be sufficiently fast-acting to enable the interstage carry digits to be propagated from the first to last stage so that the output sum signals for all binary stages reach a steady state with a minimum of delay.

Accordingly, it is an object of the present invention to provide a coded decimal adder circuit which carries out addition during each clock period of the computer in a parallel fashion on the binary signals representing the coded decimal digits of the numbers to be added.

It is a further object of this invention to provide a coded decimal adder which carries out parallel addition of binary coded decimal digits utilizing circuitry arranged to propagate the binary interstage carry digit signals so as to minimize transient effects on the sum digit signals being generated.

It is a further object of this invention to provide a coded decimal adder circuit arrangement which simplifies the process of subtracting one of the incoming numbers from the other.

Briefly, the present invention comprises a coded decimal adder circuit which adds the binary signals representing the decimal digits in a parallel fashion. The adder circuit is comprised of two simultaneously operating adder units. One adder unit responds to the two coded decimal digits in the binary number system, and the other adder unit responds to one of the coded decimal digits in the binary number system and to the other as converted to the binary "excess 6" number system. The adder unit responding to the digit in the "excess 6" system provides the binary sum output when the decimal equivalent sum is greater than the digit nine and the adder unit responding to both digits in the binary system provides the sum output when the decimal equivalent sum is equal to digit nine or less. Gates controlled by the decimal carry-out digit from the adder unit having an input in the "excess 6" system pass the correct sum represented in the binary system, as obtained from one adder unit or the other, to the output.

The novel features that are considered characteristic of this invention are set forth with particularity in the appended claims. The invention itself, both as to its organization and method of operation, as well as additional objects and advantages thereof, will be best understood from the following description when read in connection with the accompanying drawings in which:

FIG. 5 is a schematic diagram of the adder unit comprised of stages B-1 to B-4.

FIG. 8 is a block diagram of the coded decimal adder circuit of FIG. 1 adapted to perform substraction.

FIG. 9 is a circuit diagram of an inverter gate shown in the block diagram of FIG. 8.

FIG. 10 is a circuit diagram of a gate shown in the block diagram of FIG. 8.

Figure 1:
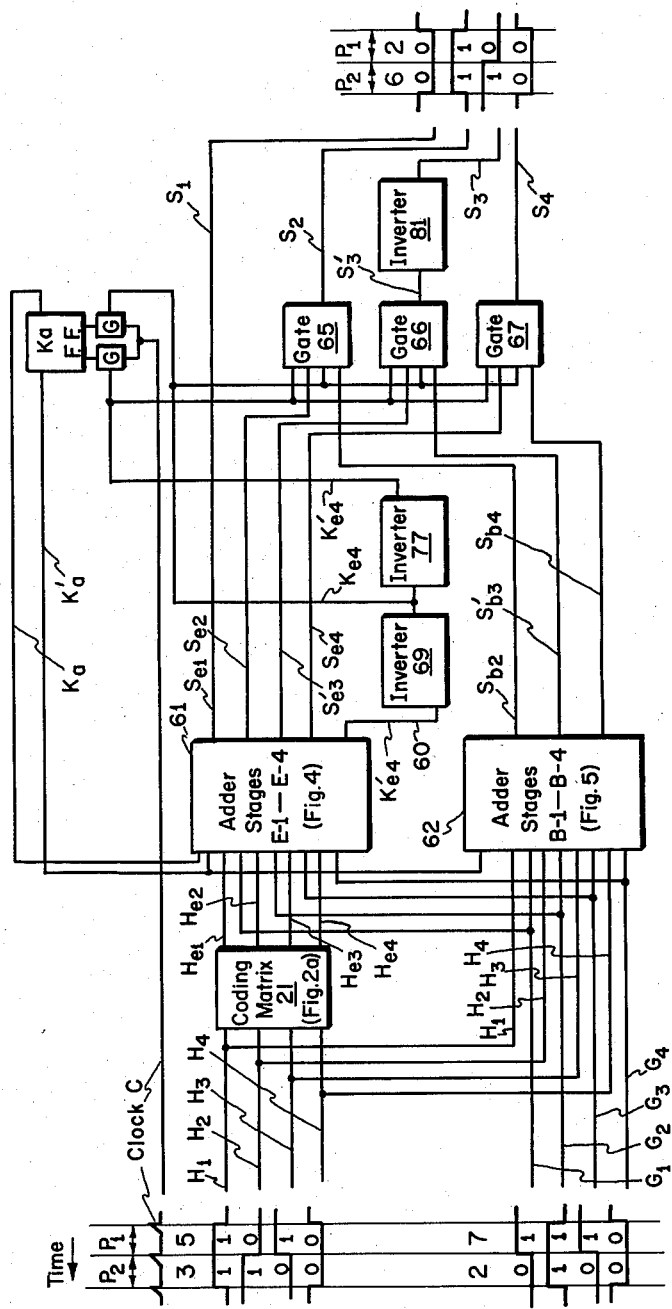
FIG. 1 is a block diagram of the coded decimal adder of the present invention.

Referring first to FIG. 1, a block diagram is shown of the coded decimal adder circuit with waveforms of binary digits representing the incoming decimal digits and the outgoing sum decimal digits.

The circuit of this invention includes two binary adder units 61 and 62 arranged to operate in parallel. Adder unit 61 is comprised of the four binary adder stages E-1 to E-4 and adder unit 62 is comprised of the four binary adder stages B-1 to B-4. The inputs to adder unit 61 include a group of four binary signals $H_{e1}$ to $H_{e4}$ representing a coded decimal digit in the binary "excess 6" number system, and a group of four binary signals $G_1$ to $G_4$ representing a coded decimal digit in the binary number system. The inputs to adder unit 62 include the group of four binary signals $H_1$ to $H_4$ and the group of four binary signals $G_1$ to $G_4$, each group representing a coded decimal digit in the binary number system. The binary representation of a decimal digit, such as provided on inputs $H_1$ to $H_4$, is shown in Table I of FIG. 2b and the binary "excess 6" representation of the same decimal digit, such as provided on inputs $H_{e1}$ and $H_{e4}$, is shown in Table II of FIG. 2b. As noted, the binary "excess 6" number system representation of a decimal digit in the latter table is formed by adding a binary "6" to the normal binary representation of a decimal digit as shown in Table I.

Figure 2:
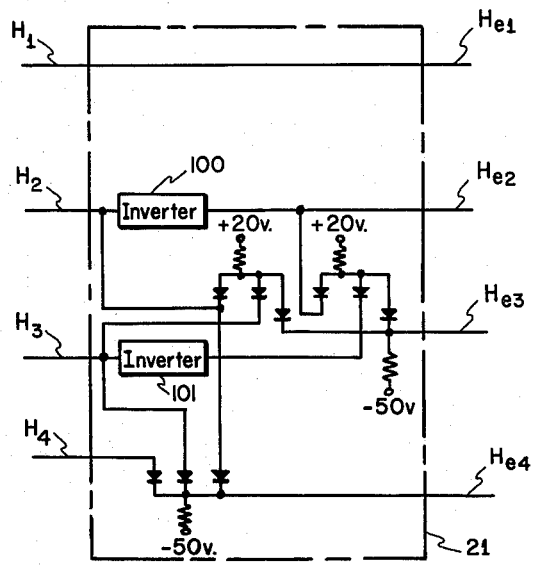
FIG. 2a is a circuit diagram of the coding matrix for the adder of FIG. 1.
FIG. 2b shows the binary system of representing coded decimal digits in Table I, and the binary "excess 6" system of representing coded decimal digits in Table II.

In the adder circuit of FIG. 1, a coding matrix 21 is provided at the input of adder unit 61. Coding matrix 21 responds to the signals $H_1$ to $H_4$ representing the incoming coded decimal digit in the binary number system to generate the signals $H_{e1}$ to $H_{e4}$ representing the same decimal digit in the binary "excess 6" number system. FIG. 2a is a circuit diagram of coding matrix 21 for accomplishing this conversion. As noted in Tables I and II of FIG. 2b, signal $H_1$ for a coded decimal digit represented by the binary number system has the same value as signal $H_{e1}$ for the same coded decimal digit represented in the "excess 6" system. However, signal $H_2$ must be inverted in order to obtain the signal $H_{e2}$, signal $H_3$ must be converted in accordance with the expression $$(H_2'H_3' + H_2H_3)$$

to obtain signal $H_{e3}$, and signal $H_4$ must be converted according to the expression $(H_2 + H_3 + H_4)$ to obtain signal $H_{e4}$. Inverters 100 and 101 are similar to inverter 69 (FIG. 1) to be subsequently described and shown in FIG. 6. The logical diode gates and inverters of FIG. 2a perform this conversion of a digit from the binary system into the binary "excess 6" system in a manner well understood in the art.

Referring back to FIG. 1, adder unit 61 responds to a coded decimal digit represented by binary digits in the binary "excess 6" system and a coded decimal digit represented by binary digits in the normal binary system, to generate the correct coded decimal sum represented in the binary system, for decimal sums greater than nine. On the other hand, adder unit 62 responds to the two coded decimal digits both represented in the normal binary system to generate the correct coded decimal sum represented in the normal binary system, for decimal sums of nine or less. As well known, the decimal carry-out digit $K_{e4}$, resulting from the addition of the two decimal digits, one represented in the binary "excess 6" system and the other in the binary system, is equal to "one" when the decimal sum is greater than nine and is equal to "zero" when the decimal sum is nine or less. Therefore, the outputs from adder units 61 and 62 are gated in response to the decimal carry-out signals $K_{e4}$ and $K_{e4}'$ from adder unit 61 to pass the correct one of the two produced sum digits to the output.

It should be noted that the sum of the lowest order binary digits of the two groups of four binary digits each is the same for addition in both the "excess 6" system of adder unit 61 and in the binary system of adder unit 62. Thus the lowest order sum digit $S_{e1}$, as generated by adder unit 61, is connected directly to the output sum line $S_1$. The remaining sum outputs $S_2$, $S_3$, $S_4$ are obtained by gating and translating outputs from the proper one of adder units 61 and 62. Thus gate 65 is supplied with signals $S_{e2}$ and $S_{b2}$, gate 66 is supplied with signals $S_{e3}'$ and $S_{b3}'$, and gate 67 is supplied with signals $S_{e4}$ and $S_{b4}$, as generated by adder units 61 and 62, respectively. These gates 65, 66, and 67 are arranged to pass respective components of a binary sub-signal to the output thereof from either adder unit 61 or 62 dependent upon the state of decimal carry-out digit signal $K_{e4}'$, from adder unit 61, which together with its complement $K_{e4}$ are supplied as control inputs to these gates. Since the output of gate 66 is sum signal $S_3'$, for reasons to be explained later, this signal is translated through inverter 81 to form sum signal $S_3$. Inverters 69 and 77 provide the two signals $K_{e4}$ and $K_{e4}'$ from the carry signal on line 60, inverter 77 being required to reduce the current load on adder unit 61. The carry digit signal $K_{e4}$, resulting from performing addition during each clock period, is stored in flip-flop $Ka$ to pass signals $K_a$ and $K_a'$ to adder unit 61, and signal $K_a'$ to adder unit 62 for performing addition of the next higher order digits during the following clock period.

It will now be broadly described how the coded decimal adder circuit of the present invention operates to add the coded decimal number 35 represented by the binary digits appearing on inputs $H_1$ to $H_4$ to the coded decimal number 27 represented by the binary digits appearing simultaneously on inputs $G_1$ to $G_4$, to thus obtain the coded decimal sum number 62 on outputs $S_1$ to $S_4$.

As shown by the waveforms in FIG. 1, during period $P_1$, the group of binary digits representing the decimal digits 5 and 7 in the binary number system are received on the inputs $H_1$ to $H_4$ and $G_1$ to $G_4$, respectively, and the signals of decimal digit 5 are immediately converted in coding matrix 21 to the binary "excess 6" system. The signals then pass in parallel into adder units 61 and 62, as shown. Thus the two groups of four binary digits each are added simultaneously in both adder units to give the binary digits on lines $S_1$ to $S_4$ representing the decimal digit 2 in the binary number system. Since the decimal sum is greater than 9, the binary sum digits from adder unit 61, represented by signals $S_{e2}$, $S_{e3}'$, and $S_{e4}$, are gated for translation to output lines $S_2$, $S_3$, and $S_4$, respectively. The binary digital signal on line $S_1$ does not require gating and is the signal $S_{e1}$ from adder unit 61, as was discussed. Also, since there is a decimal carry digit generated as a result of this addition, carrying signal $K_{e4}$ is high in potential, causing a "one" to be stored in flip-flop $Ka$ in response to the clock pulse C.

During period $P_2$, the binary signals representing the coded decimal digit 3 on lines $H_1$ to $H_4$ and $H_{e1}$ to $H_{e4}$ and the coded decimal digit 2 on lines $G_1$ to $G_4$, as well as the binary carry digit on lines $K_a$ and $K_a'$, are passed into adder units 61 and 62, to generate the binary digits on lines $S_1$ to $S_4$ representing the coded decimal number 6. Since this decimal sum is less than 9, the binary sum digits from adder unit 62 represented by signals $S_{b2}$, $S_{b3}'$, and $S_{b4}$ are gated to output lines $S_2$, $S_3$, and $S_4$, respectively.

Figure 3:
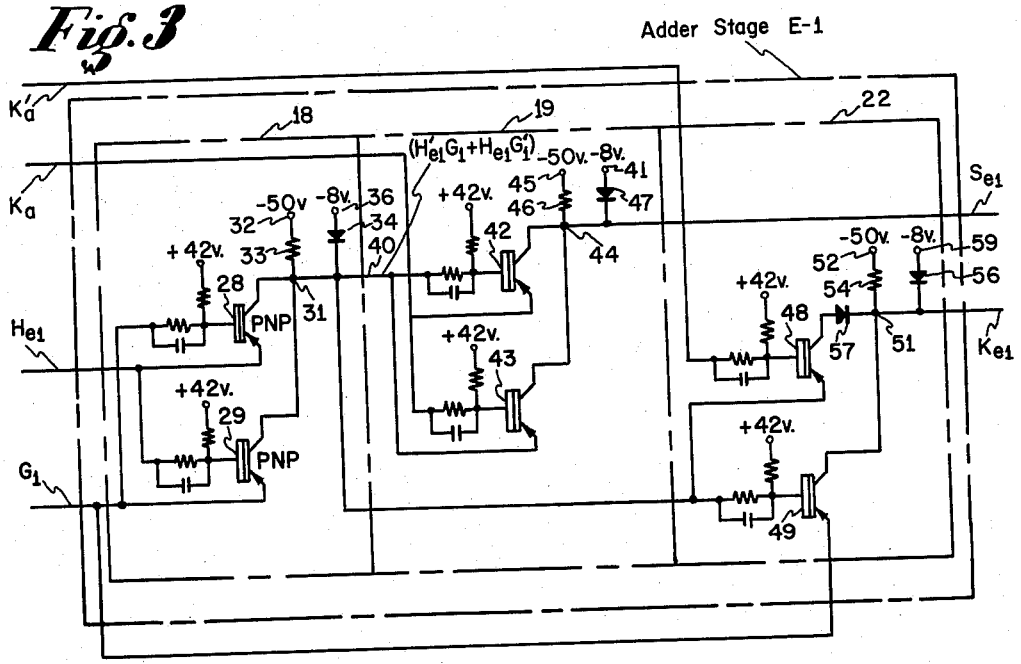
FIG. 3 is a circuit diagram of a typical binary stage used in the adder units of the present invention.

Referring next to FIG. 3, the basic binary adder stage, comprised of pairs of transistors with their bases and emitters connected to form "and" combinations of an exclusive "or" expression, will first be explained. This circuit, which is utilized in combination to form the binary adder units of the present invention, is disclosed and claimed in the application of Robert Frohman, Serial No. 625,847, filed December 3, 1956.

Adder stage E-1 includes a gating circuit 18 comprised of PNP transistors 28 and 29 which respond to the two digital input signals $H_{e1}$ and $G_1$. Signal $H_{e1}$ connects both to the emitter of transistor 28 and to the base of transistor 29, and signal $G_1$ connects both to the base of transistor 28 and the emitter of transistor 29. The collectors of the two transistors are connected to junction 31 which in turn is connected both to −50 volt terminal 32 by way of "or" circuit resistor 33 and to output line 40. Clamping diode 34 is appropriately connected between line 40 and −8 volt terminal 36 to clamp the signal at the low logical level. Gating circuit 18 functions as an exclusive "or" circuit in that it adds two input binary signals to provide a "one" output only when one of the binary input signals is "one" and the other is "zero," conditions which can be expressed by the expression $(H_{e1}'G_1 + H_{e1}G_1')$. It should be noted that gating circuit 18 uses only the binary input signals $H_{e1}$ and $G_1$ without requiring separate inverted signals representing the primes. Thus the above expression is satisfied when the input signals are different in that one input is high in potential and the other is low. It is to be noted that the two logical potential levels used in this invention are 0 and −8 volts, the 0 volt level representing a "one" or high state and the −8 volt level representing a "zero" or low state of the digital signal, for example.

The action of gating circuit 18 will now be explained in detail. Transistors 28 and 29 each form, when conducting, one of the "and" combinations of the output sum signal represented by the expression $$(H_{e1}'G_1 + H_{e1}G_1')$$

Thus, when input signal $G_1$ is high in potential and input signal $H_{e1}$ is low in potential, junction 31 swings to the high logical level of 0 volts as a result of current flowing from the emitter to collector of transistor 29 through resistor 33 to terminal 32. This high potential is indicative of the "and" combination $H_{e1}'G_1$. Likewise, when input $H_{e1}$ is high and input $G_1$ is low in potential, transistor 28 conducts current through resistor 33 to cause junction 31 to be high. This high potential at junction 31 is indicative of the "and" combination $H_{e1}G_1'$. It should be noted that reverse direction current is prevented from flowing through the non-conducting transistor since the base of the non-conducting transistor is connected to the high potential of the emitter of the conducting transistor.

Also it should be noted that if $H_{e1}$ and $G_1$ are both high or are both low in potential, neither transistor 28 nor 29 is able to conduct since the emitters and bases are connected to the same potential. Under these conditions, no current flows through resistor 33 and the low (−8 volt) potential of terminal 36 is impressed on junction 31.

Gating circuit 19, which is comprised of PNP transistors 42 and 43, is similar to gating circuit 18 except that one input is the output signal on line 40 from gating circuit 18, and the other input is the carry signal $K_a$. Thus it follows that the sum $S_{e1}$, as expressed in the equation:

$$S_{e1} = (H_{e1}'G_1 + H_{e1}G_1')K_a' + (H_{e1}'G_1 + H_{e1}G_1')'K_a$$

is obtained from gating circuit 19.

When the two digit signal inputs for gating circuit 19 are different, that is, one is at a high potential and the other is at a low potential, either transistor 42 or 43 conducts emitter to collector current through resistor 46 to −50 volt terminal 45, causing junction 44 to have a high potential of substantially 0 volts.

Carry circuit 22, which is comprised of PNP transistors 48 and 49, is similar to gating circuit 18 except that it has three input digit signals. Input carry digit signal $K_a'$ is connected to the base of transistor 48 and the output signal from gating circuit 18, represented by the expression $(H_{e1}'G_1 + H_{e1}G_1')$, is connected to both the emitter of transistor 48 and the base of transistor 49. Input digit signal $G_1$ is connected to the emitter of transistor 49. Thus it follows that the action of this circuit satisfies the logical equation:

$$K_{e1} = (H_{e1}'G_1 + H_{e1}G_1')'G_1 + (H_{e1}'G_1 + H_{e1}G_1')'K_a$$

When the signals representing the expressions applied to the base and emitter of either transistor 48 or 49 are different, that is, one is at a high potential and the other is at a low potential, that transistor will conduct emitter to collector current through resistor 54 to −50 volt terminal 52 to cause junction 51 to be at a high potential. When the signals applied to the base and emitter of either transistor 48 or 49 are the same, either both high or both low, then the −8 volts of terminal 59 is impressed on junction 51 and the carry digit signal $K_{e1}$ is at a low potential.

It is to be noted that since the base of transistor 48 is not connected to the emitter of transistor 49, the base of transistor 48 may be low while transistor 49 is conducting, a condition which could not occur in the gating circuits 18 and 19 because of the interconnection of the bases and emitters. Under these conditions the collector of transistor 48 is high. Thus, in order to prevent reverse direction current from passing through transistor 48 under the above condition, diode 57 is connected appropriately in the collector line of transistor 48.

Figure 4:
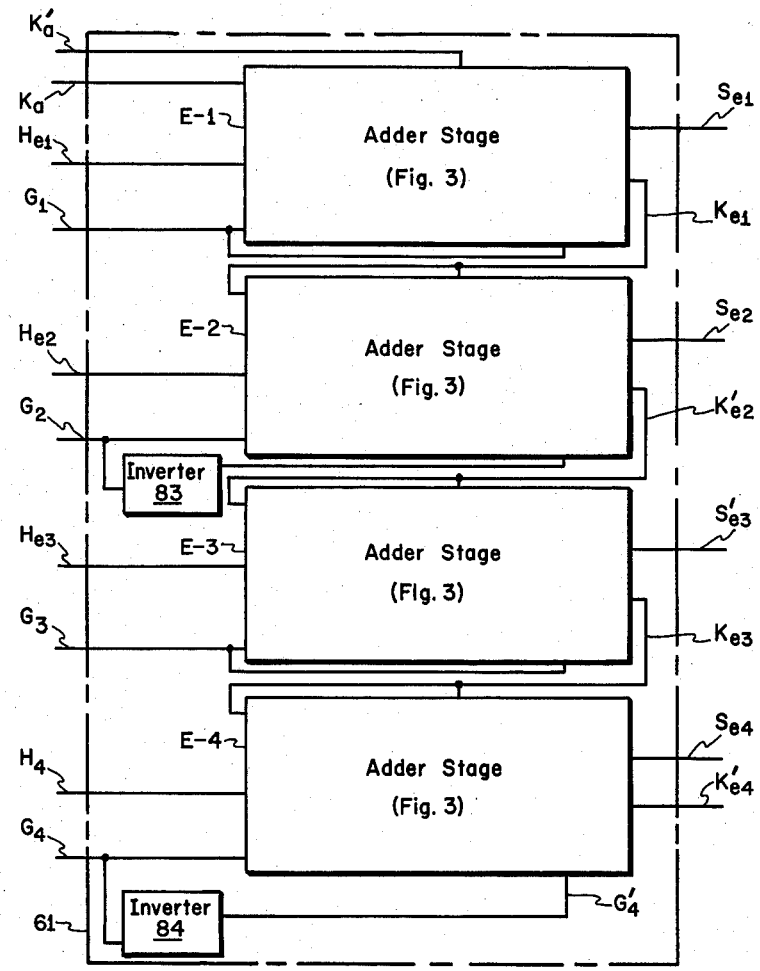
FIG. 4 is a block diagram of the adder unit comprised of stages E-1 to E-4.

Referring next to Fig. 4, adder unit 61 of Fig. 1 will be explained in detail. Each binary adder stage E–1 to E–4 forms a binary sum represented by signals $S_{e1}$, $S_{e2}$, $S_{e3}'$, and $S_{e4}$, respectively, in response to two binary input digits and a binary carry digit. Adder stage E–1 adds the two low order digits $H_{e1}$ and $G_1$, and adder stages E–2, E–3, and E–4 add the corresponding higher order digits of the two groups of four binary digits which represent the two input decimal digits to be added. The carry from the coded decimal addition of the previous clock period is carried by signals $K_a$ and $K_a'$, from flip-flop $Ka$ (FIG. 1) into adder stage E–1. The circuits are arranged such that the carry signal $K_{e1}$ from adder stage E–1 is connected to the input of adder stage E–2, the carry signal $K_{e2}'$ generated for stage E–2 is connected to the input of adder stage E–3, and the carry signal $K_{e3}$ generated for stage E–3 is connected to the input of adder stage E–4. Since, as was discussed, the propagation of the carry through all adder stages must occur with a minimum of transient time for addition to be carried out within a single clock period of the computer, the circuit is arranged so that each stage only responds to the form of the carry signal generated by the previous stage, i.e., an inverter is not provided to generate the complement of the carry signal.

Thus, as noted in FIG. 3, both the true and false forms of the incoming carry signal were provided as inputs to the adder stage E–1 there shown. However, since only the true form of the carry signal $K_{e1}$ is available as the output of stage E–1 of FIG. 4, feeding this signal into stage E–2, together with an inverted form of the $G_2$ signal, results in the false or inverted form $K_{e2}'$ of the carryout for stage E–2 being generated, as shown by the equation for $K_{e2}'$ in FIG. 4. The feeding of this false carry signal $K_{e2}'$ into stage E–3 results in the true form of the carry signal $K_{e3}$ being generated at the output of stage E–3, such that the feeding of this signal, together with the inverted form of signal $G_4$ into stage E–4, results in the false carry signal $K_{e4}'$ being generated at the output of stage E–4. The logical expressions defining the arrangement of the carry circuits for each binary stage are shown below FIG. 4.

With respect to the sum digit outputs of the stages E–1 to E–4, it should be noted that adder stage E–3 is similar to adder stage E–1 except that only carry signal $K_{e2}'$ is supplied thereto. Thus, using the prime of the carry as an input results in the output sum being the complement of the true sum. Thus the output sum is the inverted signal $S_{e3}'$ which, as seen in Fig. 1, is inverted in inverter 81 to give the sum signal $S_3$.

Referring next to FIG. 5, adder stages B–1 to B–4 of adder unit 62 will be described. Adder stage B–1 does not require a sum output since, as previously discussed, the output sum $S_1$ is always obtained from adder stage E–1. Therefore, adder stage B–1 includes only a gating circuit to form the signal representative of the expression $(H_1'G_1 + H_1G_1')$ and a carry circuit which forms the carry $K_{b1}$ in a manner similar to stage E–1 of FIG. 3. Adder stage B–2, which forms the sum signal $S_{b2}$ and the prime $K_{b2}'$ of the second stage carry, does not require explanation since it is similar to the adder stage E–2, using inverter 86 to invert the signal $G_2$. Likewise adder stage B–3, which forms sum signal $S_{b3}'$ and carry signal $K_{b3}$, is similar to adder stage E–3, as previously explained. Adder stage B–4 forms only the sum $S_{b4}$ since, as previously discussed, a decimal carry-out digit signal is not required for adder unit 62. This circuit only includes gating circuits for forming the sum $S_{b4}$ in a manner similar to the sum $S_{e1}$ in adder stage E–1.

Figure 6:
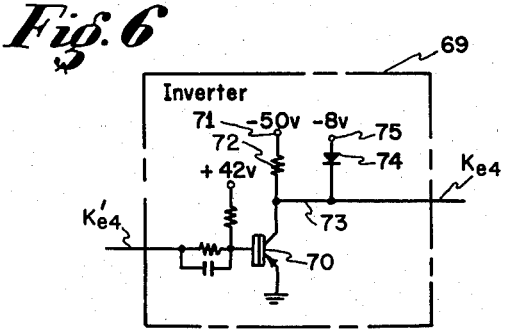
FIG. 6 is a circuit diagram of an inverter shown in the block diagram of FIG. 1.

Referring next to FIG. 6, the circuit for inverter 69, shown in the block diagram of FIG. 1, will be explained in detail. It is to be noted that all of the inverters as shown in FIGS. 1, 2a, 4, and 5 are similar to inverter 69. Inverter 69 includes transistor 70 of which the emitter is grounded, the base is connected to input signal $K_{e4}'$, and the collector is connected to −50 volt terminal 71 by way of resistor 72. Line 73, which carries the inverted signal $K_{e4}$, is connected to the collector and is clamped at the low (−8 volts) logical level of terminal 75 by appropriately poled diode 74. Thus, when signal $K_{e4}'$ is at a low potential, transistor 70 conducts through resistor 72 causing signal $K_{e4}$ to be substantially at the high potential level (0 volts); and when signal $K_{e4}'$ is at a high potential, transistor 70 is prevented from conducting and signal $K_{e4}$ is clamped at the low potential (−8 volts).

Figure 7:
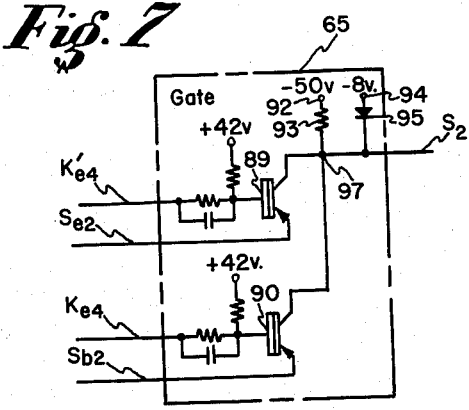
FIG. 7 is a circuit diagram of a gate shown in the block diagram of FIG. 1.

Referring next to FIG. 7, gate 65 of FIG. 1 will be described in detail. It is to be noted that gates 66 and 67 of FIG. 1 are similar to gate 65. Gate 65 is comprised of transistors 89 and 90 with the emitter of transistor 89 connected to sum signal $S_{e2}$ and the base thereof connected to carry signal $K_{e4}'$, and with the emitter of transistor 90 connected to sum signal $S_{b2}$ and the base thereof connected to carry signal $K_{e4}$. The collectors of transistors 89 and 90 are connected to junction 97, which in turn is connected to −50 volt terminal 92 by way of resistor 93, and is also connected to −8 volt terminal 94 by way of clamping diode 95 appropriately connected to prevent junction 97 from going below the low potential of −8 volts. The carry signals $K_{e4}'$ and $K_{e4}$, which are complements of each other, determine whether sum signal $S_{e2}$ or $S_{b2}$ will pass through the gate 65 to output sum line $S_2$. When $K_{e4}'$ is low in potential, resulting from a carry from the binary addition of adder 61 (FIG. 1), a high potential signal $S_{e2}$ causes transistor 89 to conduct. The current through transistor 89 passes through resistor 93 to terminal 92, thus causing sum line $S_2$ to be high in potential. When signal $S_{e2}$ is low in potential, transistor 89 is prevented from conducting, and sum line $S_2$ is at the low −8 volt potential of terminal 94. When carry signal $K_{e4}$ is at a low potential, resulting from the absence of a carry from the binary addition of adder unit 61 (FIG. 1), gate transistor 90 conducts when signal $S_{b2}$ is at a high potential, resulting in sum line $S_2$ being at a high potential. Likewise, when signal $S_{b2}$ is low in potential, sum line $S_2$ is at the low potential of terminal 94.

Referring back to FIG. 1, the operation of the coded decimal adder in response to the input waveforms shown during clock periods $P_1$ and $P_2$ will be described in detail.

During period $P_1$, binary signals representing the decimal digits 5 and 7 appear on lines $H_1$ to $H_4$ and lines $G_1$ to $G_4$, respectively, each decimal digit represented by the four binary signals on the respective lines as shown by Table I of FIG. 2b. The four digital signals on lines $H_1$ to $H_4$ are converted in coding matrix 21 to the "excess 6" system, i.e., the four digit binary number 6 is effectively added to the binary representation of the decimal number 5, to appear as signals $H_{e1}$ to $H_{e4}$ as shown in Table II of FIG. 2b. Since the decimal sum of the digits received during $P_1$ is greater than nine, adder unit 61, in response to the signals $H_{e1}$ to $H_{e4}$ and $G_1$ to $G_4$, generates the binary signals $S_1$ to $S_4$ which represent the decimal digit 2 in the binary number system.

Referring back also to FIG. 4, the propagation of the carry in adder unit 61 for the addition of the decimal numbers 5 and 7 during $P_1$ will be described. The carry signal $K_{e1}$ is generated as a high potential signal in adder stage E-1, and the prime of the carry, signal $K_{e2}'$ is generated as a low potential signal in adder stage E-2. The carry signal $K_{e3}$ is generated as a high potential signal in adder stage E-3, and the prime of the carry, signal $K_{e4}'$, is generated as a low potential signal in adder stage E-4. Each succeeding stage is aranged, as previously described, to give the sum output in response to the true carry or the prime of the carry, whichever is formed in the prior stage. This arrangement eliminates delay due to transients which would result from providing inverters between adder stages. Thus, because of the elimination of inverters and because the circuit arrangement of adder stages E-1 to E-4 produce very few signal transients, the delay in forming the carry, which must be formed successively in all stages in order to obtain the sum output, is reduced to a minimum. Therefore, the time required during each clock period to obtain the output sum is reduced to a minimum, i.e., the adder operates at a fast rate of speed. Since the binary decimal carry-out digit signal $K_{e4}$ resulting from the addition of these two groups of four binary digits is "one," indicating a sum greater than nine, the signals $S_{e1}$ to $S_{e4}$ which are effectively obtained from adder unit 61 represent the correct sum. Thus signal $S_{e1}$ is passed directly to the output to become sum signal $S_1$, whereas signals $S_{e2}$, $S_{e3}'$, and $S_{e4}$ are gated through gates 65, 66, and 67, respectively, since decimal carryout digit signal $K_{e4}'$ is low in potential. Signal $S_3'$ from gate 66 is then inverted in inverter 81 to form the output signal $S_3$.

Adder unit 62 (FIG. 1), operating simultaneously with adder unit 61 during $P_1$, receives the signals $H_1$ to $H_4$ and $G_1$ to $G_4$ which are the decimal digits 5 and 7, respectively, represented in the binary system. However, as described above, the results from adder unit 62, i.e., signals $S_{b2}$, $S_{b3}'$, and $S_{b4}$ are not used during period $P_1$. At the end of period $P_1$ the decimal carry-out signal $K_{e4}'$ from adder unit 61 is stored in flip-flop $Ka$ for addition during the succeeding period. Since $K_{e4}$ (the inverted form of $K_{e4}'$) is "one" or at a high potential, the clock pulse C is passed to the true input of flip-flop $Ka$, resulting in output $K_a$ being at a high potential.

During period $P_2$, adder unit 61 receives the coded decimal digits 3 and 2 represented by binary digits on lines $H_{e1}$ to $H_{e4}$ and $G_1$ to $G_4$, respectively, together with the carry $K_a$. The decimal carry-out digit signal $K_{e4}'$ from adder unit 61, resulting from binary addition of these two groups of binary digits, is zero, thus indicating that the decimal sum is nine or less and the correct sum must come from adder unit 62.

During period $P_2$, adder unit 62 also receives the coded decimal digits 3 and 2 represented by the binary digits on lines $H_1$ to $H_4$ and $G_1$ to $G_4$, respectively, as well as the "one" from carry flip-flop $Ka$ to generate the sum signals $S_1$ to $S_4$ which correctly represent the decimal digit 6 in the four digit binary number system. Referring back to FIG. 5, the propagation of the interstage binary carry digits during period $P_2$ will be described. Adder stage B-1 first generates $K_1$ as a high potential signal and then adder stage B-2 generates the prime of the carry, signal $K_2'$, as a low potential signal. In response to carry signal $K_2'$, adder stage B-3 generates carry signal $K_3$ as a low potential signal input to adder stage B-4. It is to be noted that the prime of the carry which is formed in the even stage B-2 is passed directly to adder stage B-3 in order to eliminate delay in forming the carry, as in adder unit 61. Since $S_{e1}$, which is the least significant digit from the addition in adder unit 61, is the same as $S_{b1}$, the signal $S_{e1}$ is supplied directly to the output sum line $S_1$. In this instance, since carry signal $K_{e4}'$ from stage E-4 of adder unit 61 is "one" or high in potential, signals $S_{b2}$, $S_{b3}'$, and $S_{b4}$ are passed through gates 65, 66, and 67, respectively, to output sum lines $S_2$, $S_3'$, and $S_4$. Signal $S_3'$ is then inverted in inverter 81 to form sum signal $S_3$.

Reference should next be made to FIG. 8, which is a block diagram of the adder circuit of FIG. 1 arranged to include subtraction.

As well known, in order to subtract, the "nine's" complement of the incoming number representing the subtrahend must be obtained and the carry flip-flop $Ka$ must be initially triggered to a "one" state. The resulting number is then added to the other number, the minuend, to obtain the difference of the numbers. The "nine's" complement of the subtrahend is easily obtained when the coded decimal digit is represented in both the binary system and in the binary "excess 6" system. As shown in FIG. 2b, the complement of a coded decimal digit represented in the binary "excess 6" system is the "nine's" complement of the same decimal digit represented in the normal binary number system. Also the complement of a coded decimal digit represented in the normal binary system is the "nine's" complement of the same decimal digit represented in the binary "excess 6" system. Thus, in the present coded decimal adder circuit, subtraction is easily accomplished by merely providing for inverting the binary "excess 6" representation of the input digit which is the subtrahend, and gating it into the adder unit 62 and simultaneously inverting the normal binary representation of this same input digit and gating it into adder unit 61.

Before further describing the subtraction process performed by the circuit of FIG. 8, reference will be made to FIG. 9, which is a wiring diagram of inverter gate 103 of FIG. 8. Here transistor 106, which is of the PNP type, is gated by signal $A_1'$ applied to its emitter. The signal on line $H_{e1}$ is applied to the base of transistor 106 to appear at the collector as signal $H_{e1}'$. When signal $A_1'$ is high and signal $H_{e1}$ is low in potential, the inverter gate 103 is open, enabling transistor 106 to conduct current from collector to emitter and to −50 volt terminal 107 by way of resistor 108. Thus signal $H_{e1}'$ on junction 109 is at the high level potential resulting in the inversion of the low input signal $H_{e1}$. When the signal on line $H_{e1}$ is high, transistor 106 is prevented from conducting and the −8 volts of terminal 110 is impressed on line $H_{e1}'$ through appropriately poled diode 111 to cause the signal on line $H_{e1}'$ to be at the low level potential.

A wiring diagram of gate 102 is shown in FIG. 10. Here transistor 114, which is of the PNP type, functions as a gate controlled by the signal on line $A_1$. The signal on line $A_1$ is applied to the base of transistor 115, the emitter of which is connected to ground and the collector of which is connected to −50 volt terminal 116 by way of resistor 117. Thus when the signal on line $A_1$ is at the low potential, transistor 115 conducts and the signal on line $A_1'$ is at the high potential. When the signal on line $A_1$ is high, transistor 115 is prevented from conducting and the −8 volts of terminal 118 is impressed on line $A_1'$ through diode 119 to give a low signal. This low signal on line $A_1'$ causes transistor 114 to act as an open gate.

The signal on line $H_1$ is applied to the emitter of transistor 114, the collector of which is connected to line $H_1'$. When the signal on line $H_1$ is high and the signal on line $A_1'$ is low, transistor 114 conducts current to −50 volt terminal 120 by way of resistor 121 causing the signal on line $H_1'$ to be high in potential. When the signal on line $H_1$ is low, transistor 114 is prevented from conducting and the low −8 volt potential of terminal 122 is impressed through diode 123 to line $H_1'$. Thus transistor 114 acts as a gate of the signal on line $H_1$ in response to the add signal on line $A_1$.

As previously noted, inputs $H_1$ to $H_4$ represent the subtrahend in FIG. 8. Control signal $A_1$ is high in potential when adding, and control signal $A_1'$ is high in potential when subtracting, the two signals being the inverse of each other. When signal $A_1$ is high, the gates 102 are open and the inverter gates 103 are closed, thus allowing addition to be performed as described in the adder circuit of FIG. 1. When signal $A_1'$ is high, the inverter gates 103 are open and gates 102 are closed, thus preventing the input signals from passing through their normal path for addition, as shown in FIG. 1. The binary signals representing a coded decimal digit on lines $H_1$ to $H_4$ are inverted by inverter gates 103 to pass into adder unit 61 as the "nine's" complement of the decimal digit in the "excess 6" system along with binary inputs on lines $G_1$ to $G_4$ representing the other input decimal digit. The binary signals representing a coded decimal digit in the binary "excess 6" system on lines $H_{e1}$ to $H_{e4}$ are inverted in inverter gates 103 to pass into adder unit 62 as the "nine's" complement of the digit in the normal binary system along with the binary inputs on lines $G_1$ to $G_4$ representing the other input decimal digit. Thus the input to adder unit 61 in the "excess 6" system is gated and inverted to form the "nine's" complement in the normal binary system which is the subtrahend supplied to adder unit 62. Also the input to adder unit 62 in the normal binary system is gated and inverted to form the "nine's" complement in the "excess 6" system which is the subtrahend supplied to adder unit 61.

Also to perform subtraction, as previously noted, the carry flip-flop Ka of FIG. 1 is initially set true by applying a signal source (not shown) to line $K_{e4}$. The addition is then carried out in adder units 61 and 62, the results being gated in the gating arrangement of FIG. 1, as discussed in reference to the coded decimal adder of this invention, to provide a coded decimal number representing the difference on lines $S_1$ to $S_4$. Thus the two coded decimal adders arranged in parallel allow subtraction to be carried out with a minimum of circuitry by only inverting the input signals of the subtrahend and routing them to the opposite adder units.

While the form of the invention shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. A coded decimal adder circuit for adding two decimal digits coded in four-digit binary form, comprising: first and second sets of input lines providing respective first and second sets of concurrent binary signals representing the respective decimal digits in the normal binary number system; converting means for converting the set of binary signals on the first set of input lines to represent the decimal digit in the binary "excess 6" number system; a first set of sum lines; a first adder unit, including a carry digit line, responsive to the set of signals on the output of said converting means and to the set of signals on the second set of input lines for providing a set of concurrent signals on said first set of sum lines and for providing a carry signal; a second set of sum lines; a second adder unit responsive to the set of signals on first set of input lines and the set of signals on said second set of input lines for providing a set of concurrent signals on said second set of sum lines; a set of output lines; and gating means responsive to a decimal carry signal from said first adder unit on said carry digit line for gating signals from said first or second sum lines to said output lines.

2. In a computer system, a circuit for adding coded decimal digits comprising: a first set of input lines having a respective first set of concurrent binary signals thereon representing a decimal digit in the binary number system; a second set of input lines having a respective second set of concurrent binary signals thereon representing a decimal digit in the binary number system; means including a matrix, for converting the binary signals representing the decimal digit on said first set of input lines to the corresponding binary "excess 6" signals; a first adder responsive to the set of signals on the output of said matrix and the set of signals on said second set of input lines, for generating a set of binary signals representing a sum decimal digit greater than nine in the binary number system; a second adder responsive to the sets of signals on said first and second sets of input lines, for generating a set of binary signals representing a sum decimal digit of nine or less in the binary number system; a set of output lines; and gating means for gating only the set of output binary signals representing the true sum decimal digit from said first and second adder, to said set of output lines.

3. A circuit for adding coded decimal digits represented in the binary number system, comprising: first and second sets of input lines for receiving the concurrent respective sets of binary signals representing decimal digits to be added; means to concurrently convert the binary representation on the first set of input lines into an "excess 6" binary representation; a carry flip-flop circuit having output lines and provided with input and output lines; a first adder responsive to the set of signals in the "excess 6" system, the set of signals on the second set of input lines, and signals on the output lines of said carry flip-flop circuit; a second adder responsive to the set of signals on said first set of input lines, the set of signals on said second set of input lines, and signals on the output lines of said carry flip-flop circuit; a first set of sum lines and a decimal carry line from said first adder, said carry line connected to the input of said carry flip-flop circuit; a second set of sum lines from said second adder; a set of output lines; and means responsive to the signal on the decimal carry line from said first adder for gating sum signals from said first or second sum lines to said output lines.

4. A circuit as described in claim 3, wherein said first and second adders are each comprised of four binary adder stages formed of exclusive "or" gating circuits, each said gating circuit comprising: a first and second transistor having a base electrode, an emitter electrode, and-collector electrode; a common resistor connecting the collectors of both said transistors to a potential source; an output lead connected to said collectors; and means whereby the binary signals representing the adder input signals and output signals from other similar gating circuits are applied to the emitters and bases of said transistors to enable only one of the transistors to conduct through said resistor at a time to thereby generate a signal on said output lead representing a logical "and" combination of the signal on the emitter and the inverse of the signal on the base of the conducting transistor.

5. A circuit for adding binary coded decimal digits comprising: first and second groups of input lines receiving respective sets of concurrent binary signals representing respective coded decimal digits in the binary system; a third group of input lines; a converting matrix responsive to the set of binary signals on said first group of input lines for supplying to said third group of input lines a set of concurrent binary signals representing the decimal digit in the binary "excess 6" system; a first group of sum lines; a first adder responsive to the sets of concurrent binary signals on the second and third groups of input lines, to generate a set of concurrent sum signals on said first group of sum lines; a second group of sum lines; a second adder responsive to the sets of concurrent binary signals on said first and second groups of input lines to generate sum signals on said second group of sum lines; a group of output lines; and gating means responsive to a decimal carry signal from said first adder for gating the desired signals from said first or second group of sum lines to said group of output lines.

6. A coded decimal adder circuit for adding two decimal digits coded in four-digit binary form, comprising: first and second sets of input lines, for receiving in parallel respective sets of concurrent binary signals representing the first and second decimal digits in the normal binary number system; converting means having an output, for converting the set of concurrent binary signals as received on the first set of input lines to a corresponding set of binary signals representing the decimal digit in the binary "excess 6" number system; a first set of sum lines; a first adder operating in response to the set of signals on the output of said converting means and the set of signals on the second set of input lines, for supplying a set of concurrent sum signals on said first set of sum lines; a second set of sum lines; a second adder operating simultaneously with said first adder in response to the set of signals on said first set of input lines and the set of signals on said second set of input lines, for supplying a set of concurrent sum signals on said second set of sum lines; a set of output lines; and gating means controlled in response to a decimal carry-out digit signal from said first adder for gating the desired set of signals from said first or second sum lines such that the binary signals representing the true sum decimal digit in the normal binary number system are supplied in parallel to said set of output lines.

7. An adder circuit comprising: first and second sets of four input lines each, the lines of each set being simultaneously impressed with a respective set of four concurrent binary signals representing a respective binary coded decimal digit; a coding matrix for converting the set of signals on said first set of input lines into a set of signals representing a different binary coded decimal digit; a carry flip-flop having output lines; a first adder responsive to the set of signals on the output of said matrix, to the set of signals on the second set of input lines and to the signals on said carry flip-flop output lines; a second adder responsive to the sets of signals on said first and second sets of input lines and the signals on said carry flip-flop output lines; a first set of four sum lines, one for each order of said first adder, and a second set of three sum lines, one for each of the three higher orders of said second adder; a gate means connected to each of the three higher order lines of the sets of sum lines for said first and second adders; a set of four output lines, one connected to the lowest order sum line of said first adder and the other three connected to the output of said gates; and a carry output from said first adder for controlling said gates to pass the three higher order signals on the first set of sum lines to said set of output lines if said carry output is a one, and to pass signals from the three higher order signals on the second set of sum lines to said set of output lines if said carry output is a zero.

8. A circuit for adding and subtracting numbers represented by binary decimal digits comprising: first and second sets of input lines having respective sets of binary signals thereon representing respective decimal digits in the binary number system; a coding matrix for converting the binary signal representation of the decimal digit on said first set of input lines to the binary "excess 6" number system; a first adder; a second adder; a first gating means for passing output signals from said coding matrix to said first adder and the signals on said first set of input lines to said second adder; a second gating means for passing an inverted form of the signals on said first set of input lines to said first adder and an inverted form of the signals from said coding matrix to said second adder; a set of output lines; output gating means responsive to a carry-out digit signal generated by said first adder for gating a selected one of the outputs of said first and second adder to the said output lines; and means providing signals for opening said first gating means and closing said second gating means to permit said adder to add the digits represented by the sets of signals on said first and second set of input lines, and for closing said first gating means and opening said second gating means to permit said adders to subtract the digit represented by the set of signals on said first set of input lines from the digit represented by the set of signals on the second set of input lines.

9. Electronic adding means for adding first and second decimal digits represented by respective first and second concurrent sets of concurrent binary signals in coded 4-bit binary form, comprising: first and second sets of four signal input lines each upon which sets of lines respective ones of said first and second sets of concurrent binary signals appear; conversion means for converting the first set of binary signals to a set of concurrent equivalent output binary signals in excess-six number system form; first and second electronic adder units having respective sets of output lines and responsive respectively to the said set of equivalent output binary signals and said second set of concurrent signals, and to said first and second concurrent sets of concurrent binary signals, respectively, and said adder units being effective to form respective first and second binary coded 4-bit concurrent signal outputs comprising, respectively, in the first signal output the sum representation of the equivalent output binary signal set in binary excess-six number system and said second set of binary signals and in the second signal output the sum representation of said first and second sets of binary signals; control means for indicating presence or absence of a carry digit signal resulting from operations of said first adder unit; and gating and output means controlled by said control means in response to the character of said indication of a carry to pass as adding means output only that one of said first and second signal outputs which correctly represents in binary coded 4-bit form the correct sum of said first and second decimal digits.

10. An adder circuit comprising: first and second sets of signal input lines, each of said sets of lines having imposed thereon a respective one of first and second sets of concurrent binary signals respectively representing first and second decimal digits in a first code system; a coding matrix for converting said first set of concurrent binary signals on the first set of input lines into a special coded signal set of concurrent signals representing said first digit in a second code system; carry indicating means for providing a carry signal indicative of a carry resulting from an adding operation; a first electronic parallel adder effective in response to first adder inputs comprising said carry signal, said special coded signal set, and said second set of binary signals, to provide a first adder output representing the sum of said first adder inputs; a second electronic parallel adder effective in response to second adder inputs comprising said first and second sets of binary signals and said carry signal to provide a second adder output representing the sum of said second adder inputs; and gating means controlled by said carry signal for selecting and passing from said first and second adder outputs only the output correctly representing the sum of said carry and said first and second decimal digits.

References Cited in the file of this patent
FOREIGN PATENTS 738,605     Great Britain _____ Oct. 19, 1955

OTHER REFERENCES

High Speed Computing Devices, McGraw-Hill Book Company, copyright 1950, New York. Pages 289 to 293.